United States Patent [19]

Rieppel et al.

[11] 4,166,209

[45] Aug. 28, 1979

[54] APPARATUS FOR REDUCING OPERATING NOISE OF THE AIR-CARBON ARC CUTTING AND GOUGING PROCESS

[75] Inventors: Perry Rieppel, Worthington; Raymond Sadauskas, Columbus, both of Ohio

[73] Assignee: Arcair Company, Lancaster, Ohio

[21] Appl. No.: 848,827

[22] Filed: Nov. 7, 1977

[51] Int. Cl.² .............................................. B23K 7/00
[52] U.S. Cl. ....................................... 219/70; 219/68; 219/69 R
[58] Field of Search ......................... 219/68, 70, 69 R

[56] References Cited

U.S. PATENT DOCUMENTS

| 1,746,208 | 2/1930 | Alexander | 219/69 M |
| 2,527,490 | 10/1950 | Adams | 219/70 |
| 2,706,236 | 4/1955 | Stepath | 219/70 |
| 3,220,459 | 11/1965 | Wilson | 219/70 X |
| 3,522,406 | 8/1970 | Sipos | 219/74 |
| 3,573,419 | 4/1971 | Henderson | 219/70 |

FOREIGN PATENT DOCUMENTS 284215  12/1970  U.S.S.R. ................................. 219/74

Primary Examiner—Richard R. Kucia
Attorney, Agent, or Firm—James C. Simmons; Barry Moyerman; E. Eugene Innis

[57] ABSTRACT

The operating noise level of the air-carbon arc cutting and gouging process can be reduced by controlling the air velocity in the area where the air impinges on the arc column to between 90 and 170 feet per second. Velocity control can be achieved by modifications to existing air-carbon arc cutting and gouging torches.

2 Claims, 6 Drawing Figures

AIR PRESSURE PSI AND RANGE OF VELOCITY, ( )
FT./SEC. AT ARC AREA

APPARATUS FOR REDUCING OPERATING NOISE OF THE AIR-CARBON ARC CUTTING AND GOUGING PROCESS

BACKGROUND OF THE INVENTION

1. Field of the Invention

The present invention pertains to the air-carbon arc cutting and gouging process used in industry for cutting, cleaning, or preparing metals for subsequent fabrication operations. In the hands of a skilled operator, an air-carbon arc cutting and gouging torch can be used to remove a defect in a workpiece such as a steel plate and in removing the defect prepare the cavity for repair by a subsequent filler metal welding operation. The process also is used to prepare metals for welded construction.

2. Description of the Prior Art

The air-carbon arc cutting and gouging process was first described and claimed in U.S. Pat. No. 2,706,236. According to the process as now practiced, a carbon (graphite) electrode, normally having a copper coating, is positioned so that an arc can be struck between the electrode and the workpiece. Coincidentally, with initiation of the arc, compressed air is caused to flow down the side of the electrode following the direction of travel to forceably remove (blast away) molten metal produced by the effect of the electric arc.

A suitable hand torch for practicing the air-carbon arc process is disclosed and claimed in U.S. Pat. No. 3,573,419. All prior art torches generally provide means such as a valve to control the admission of air to the torch head which directs the air along the electrode. All of the prior art torches utilize air normally found in central high pressure air systems in factories. It has been found that this air pressure usually varies between 80 and 100 pounds per square inch (psi). Whatever air pressure is available is utilized in the practice of the air-carbon arc process as long as it will remove the molten metal from the area of the electric arc maintained between the electrode and the workpiece.

Measurements have shown that when utilizing air pressures normally found in a manufacturing plant (e.g. 80 to 100 psi), the noise level striking an operator's ear is at the level of from 120 to 125 dbA. Noise levels of this magnitude can, over a long period of time, cause damage to the ear of a constant user of the process.

SUMMARY OF THE INVENTION

Having made extensive studies of the basic air-carbon arc cutting and gouging process, the problem of operating noise was identified and solutions sought. One solution to reducing the overall noise level of the air-carbon arc cutting and gouging process was found to result from controlling the velocity of the air in the area where the air contacts the arc to maintain a velocity in that area of between 90 and 170 feet per second. Velocities in this range can be achieved by keeping the air pressure in the torch head at or below a level below 60 psi.

In discovering this phenomenon and a partial solution to the noise problem, a conventional air-carbon arc cutting and gouging torch was modified so that the operator could selectively operate at lower flow rates of air and hence lower noise levels and, if necessary, use a higher air flow for limited periods of time to effect removal of larger defects and/or work at a faster rate.

Controlling several parameters of the air-carbon arc cutting and gouging process, namely air flow, arc voltage, electrode composition, and the distance the electrode projects from the torch head (i.e. stick-out) and surrounding the operator's ears with a sound attenuating material will result in reducing sound pressure on an operator's ears to the level of 85–95 dbA. A sound level of this magnitude meets current requirements of the Occupational Safety and Health Act (OSHA).

Therefore, it is the primary object of this invention to provide improvements to air-carbon arc cutting and gouging torches.

It is another object of the present invention to provide an air-carbon arc cutting and gouging torch which permits the operator to selectively reduce the operating noise level of the process.

DETAILED DESCRIPTION OF THE PREFERRED EMBODIMENT

The basic air-carbon arc cutting and gouging process is described in U.S. Pat. No. 2,706,236, the specification of which is incorporated herein by reference.

Figure 1:
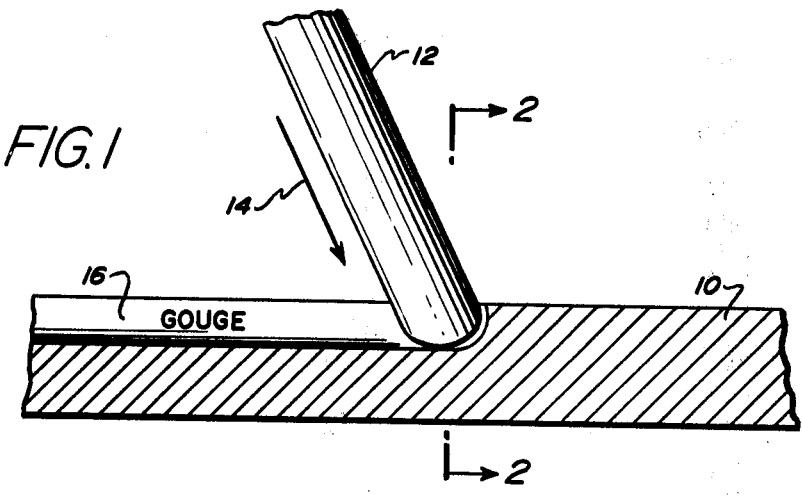
FIG. 1 is a schematic diagram of the air-carbon arc cutting and gouging process.
Figure 2:
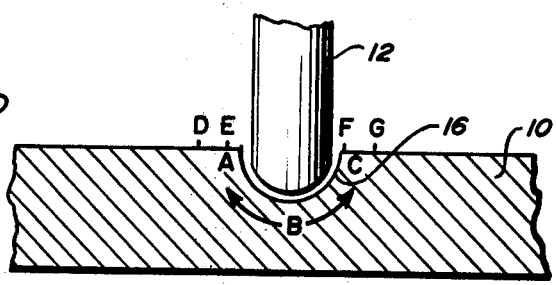
FIG. 2 is a section taken along lines 2—2 of FIG. 1.

Referring to FIG. 1 which illustrates the process schematically, a workpiece 10 is set on a fixed surface so that the operator can see either a defect to be removed or where the workpiece 10 is to be prepared for subsequent operations. An electrode 12 of a carbon material such as disclosed in U.S. Pat. No. 3,131,290 is placed in relationship to the plate generally as shown. An arc (not shown) is struck between the workpiece and the electrode, and simultaneously air, in the direction shown by arrow 14 is caused to flow down along the trailing side of the electrode. Thus, as the operator moves the electrode along the workpiece in a direction from left to right as shown in FIG. 1, a gouge such as shown in cross-section in FIG. 2 at 16 is produced in workpiece 10. (Of course if the process is used for cutting, the electrode will project through the workpiece.)

In addition to the torches shown in the first of the aforementioned patents, one hand-held air-carbon arc cutting and gouging torch currently in use, is disclosed in U.S. Pat. No. 3,573,419 the specification of which is incorporated herein by reference and made a part hereof. Torches shown in this patent are currently marketed as a K-Model torch by the Arcair Company of Lancaster, Ohio.

In using torches such as shown in the prior art and in practicing the process of the prior art, noise pressure on the ear of an operator is measured at between 120 and 125 dbA if the operator does not use any ear protection.

It was discovered that if the velocity of the air in the area of the arc between the electrode 10 and workpiece 12 is between 90 and 170 feet per second (fps), the ability to cut or gouge is not altered but the noise level on an operator's ear is reduced between 8 and 12 dbA.

In studying the air-carbon arc cutting and gouging process airflow and velocity patterns, it was shown if the pressure in the torch head were reduced to 60 pounds per square inch (psi), then flow velocities within the above-specified range were achieved. In particular, referring to FIG. 2, the air velocity in the gouge or arc area at points A, B. and C, was shown to be between 105 and 130 feet per second, and the air velocity at locations D, E, F and G was between 120 and 150 feet per second.

Most commercial shop operations having a central high pressure air supply operate these systems at between 80 and 100 psi. One method of achieving the velocity control of the present invention is to reduce the air pressure in the torch head to a level at or below 60 psi.

As stated above, noise level produced during conventional air-carbon arc cutting or gouging is directly related to the pressure and flow of air and therefore the air-velocity pattern of air impinging in the arc area. If the air pressure across the torch head is too high, the air velocity will be greater than necessary and more noise will be produced than is necessary. At a given pressure and flow of air utilizing a standard commercially available torch, the air velocity in the arc area is also determined by the distance from the air outlets of the torch to the arc area.

As the electrode is consumed during a manual operation, the air jets become positioned closer to the arc area and, consequently, the air velocity around the arc increases. This results in a greater noise level. Conventional torches provide no means for the operator to adjust the air flow (either up or down) without stopping and resetting the air pressure by use of an air-line regulator.

Figure 3:
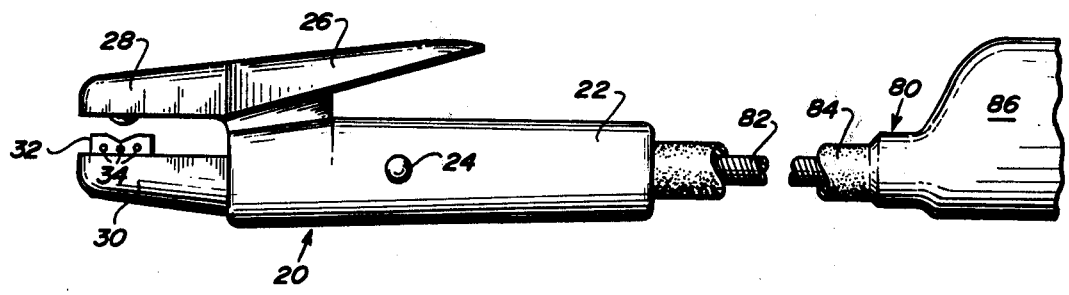
FIG. 3 is a front elevational view partially in section of an air-carbon arc cutting and gouging torch according to the present invention.

There is shown in FIGS. 3 and 4 a modification to a conventional torch such as disclosed in U.S. Pat. No. 3,573,419 which permits an operator to conduct air-carbon arc cutting and gouging at reduced noise level by reducing the air flow through the torch while providing the operator ready means for increasing the air flow should an extra deep defect or other workpiece conditions dictate the need for more or faster metal removal capability possible with higher air flow.

The torch of FIG. 3 is shown generally as 20 and has affixed thereto a cable shown generally as 80. Torch 20 includes a handle 22, air valve 24, upper jaw control arm 26, upper arm 28, lower arm 30 and nozzle or head 32 containing a plurality of air orifices 34. In practicing the air-carbon arc cutting and gouging process, lever 26 is depressed to separate upper and lower arms (28, 30) so that an electrode can be inserted in the V grooved portion of head 32. The electrode thus inserted is positioned so that air emanating from orifices 34 will flow down one side of the electrode (not shown). As disclosed in the aforementioned patent, air is conducted to the orifices 34 by means of a concentric cable shown generally as 80. The cable includes an inner electrical conductor 82 and spaced therefrom an outer insulating cover 84 with a boot 86 on the end of the cable remote from the torch 20. The cable assembly 80, as is well-known in the art, is connected to a source of current and high pressure air. The air is conducted around the central conductor 82 through the torch body and out through the orifices 34. Flow of air through the torch is controlled by spool valve 24 which is shown in detail in FIGS. 4(a) and 4(b).

Figure 4A:
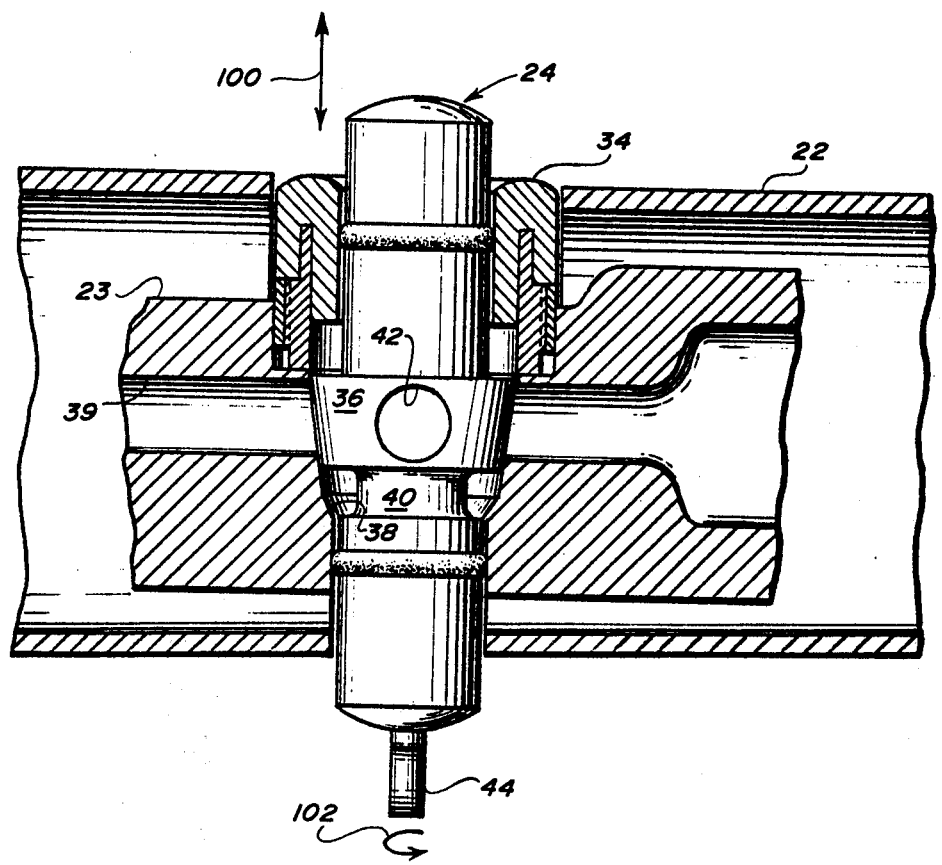
FIG. 4(a) is an enlarged longitudinal fragmentary view partially in a section of the valve portion of the torch of FIG. 1.
Figure 4B:
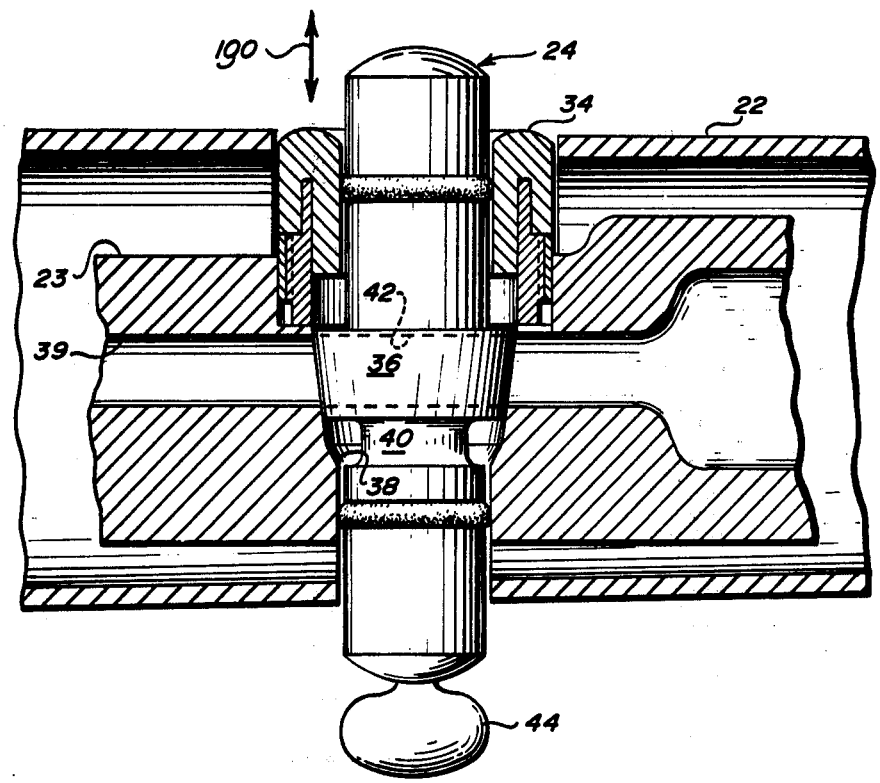
FIG. 4(b) is an identical section to that of FIG. 4(a) with the spool valve shown in a different operating position.

The spool valve 24 is affixed to the torch body 23 by a bonnet 34 as is well-known in the art. The spool valve 24 includes a central, generally frustroconical portion 36 which moves along a correspondingly tapered section 38 of the torch body 23. As the spool valve 24 is moved upwardly (reference being to the directional arrow 100) a passageway 39 in the body 23 is uncovered thus admitting air passed the reduced diameter portion 40 of spool valve 24 into passageway 39 and through a further passageway (not shown) that communicates with torch head 32 as is shown in U.S. Pat. No. 3,573,419. According to the present invention, a transverse generally cylindrical aperture 42 is provided through section 36 of spool valve 24. Parallel to the longitudinal axis of the passage 42, a generally flat-sided thumb actuator 44 (FIG. 4) is placed on one projecting end of spool valve 24. As shown in FIG. 4(a), when the spool valve is closed (downward position), passage 42 has no effect on the air flow through the torch. However, if the operator rotates (rotational indicator 102) the spool valve 24 90° and moves it into a position such as shown in FIG. 4(b), although the frustroconical portion 36 has not been moved out of engagement with the main air passage 39, the passage 42 now communicates with the main air passage 39 in the torch 20 and thus allows air to be admitted to the torch head 32. Sizing of aperture 42 permits control of the pressure in the torch head and thus provides velocity control in accord with the present invention.

If an operator is using the torch at low flow (FIG. 4(b) mode) and desires to increase the air velocity to effect faster cutting or gouging, or to remove a stubborn defect, then all he has to do is slide the spool valve upwardly and full source pressure is available at the torch head and thus higher velocity air flow at the arc area.

A series of experiments using the teaching of the present invention were conducted and the results set out in Table I as follows:

TABLE I

| AIR PRESSURE PSI | ELECTRODE SIZE/TYPE | | NOISE LEVEL dbA |
|---|---|---|---|
| 90 | ⅜" D.C. | (Conventional) | 119–122 |
| 60 | ⅜" D.C. | " | 115–116 |
| 40 | ⅜" D.C. | " | 111–113 |
| 90 | ¼" D.C. | (Conventional) | 118–121 |
| 60 | ¼" D.C. | " | 114–115 |
| 40 | ¼" D.C. | " | 111–113 |
| 90 | ⅜" SPECIAL D.C. | | 110–113 |
| 60 | ⅜" SPECIAL D.C. | | 108–110 |
| 40 | ⅜" SPECIAL D.C. | | 103–106 |
| 90 | ¼" SPECIAL D.C. | | 108–111 |
| 60 | ¼" SPECIAL D.C. | | 107–109 |
| 40 | ¼" SPECIAL D.C. | | 104–106 |

Figure 5:
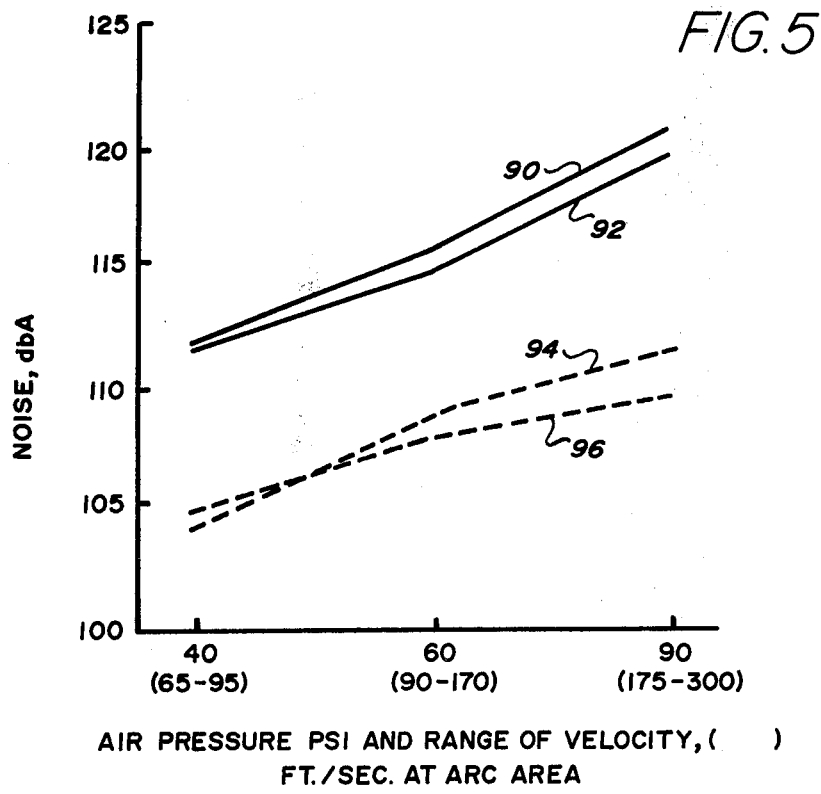
FIG. 5 is a plot of noise level against air pressure and velocity range with different electrodes used in the air-carbon arc cutting and gouging process.

D.C. = Direct Current
Note:
Arcair Model K-5 and K-3 torch
GR-1933 or Scott 452 Sound Level Meter From the foregoing, it is apparent that when a conventional direct current electrode is employed in the air-carbon arc cutting and gouging process and the air pressure in the torch head is reduced, there is a significant reduction in the level of noise falling on an operator's ear. This is graphically shown in the plot of FIG. 5 wherein curve 90 shows the results of the tests run with a ½" diameter conventional D.C. carbon electrode and curve 92 shows the results from using a ¼" diameter conventional D.C. carbon electrode. A conventional electrode is one such as disclosed in U.S. Pat. No. 3,131,290.

Disclosed in copending U.S. application Ser. No. 848,817, filed Nov. 7, 1977 is a series of electrodes containing additives which electrode compositions also serve to reduce the operating noise level (at high flow) in the conventional air-carbon arc cutting and gouging process. The special electrodes when used in conjunction with the lower air flows, provide even more favorable noise levels at an operator's ear. The data of Table I is shown graphically in FIG. 5 where curve 94 shows the results using ¼" diameter special D.C. carbon electrode and curve 96 shows the results using a ¼" diameter special D.C. carbon electrode. Referring back to the table, by combining the special electrode with the reduced flow rate, it is possible to effect reductions in noise level of at least 14 dbA.

Furthermore, it has also bee discovered that the operating noise level of the process can be significantly affected by the distance the electrode projects from the torch head 32 toward the workpiece. This distance is commonly known as "stick-out" and serves to define the aerial path of the air emanating from the torch head 32 orifices 34 which must be traversed to reach the arc area under the electrode. The results of various experiments conducted to determine the effect of stick-out are summarized in Table II.

TABLE II

| AIR PSI | S.O.[1] | AMPS | VOLTS | ELECTRODE | dbA |
|---|---|---|---|---|---|
| 80 | 7" | 750 | 40 | ¼ DC | 113–114 |
| 80 | 4" | 750 | 40 | ¼ DC | 113–114 |
| 80 | 2" | 750 | 40 | ¼ DC | 114–116 |
| 60 | 7" | 750 | 40 | ¼ DC | 109–110 |
| 60 | 4" | 750 | 40 | ¼ DC | 110–112 |
| 60 | 2" | 750 | 40 | ¼ DC | 110–112 |
| 50 | 7" | 750 | 40 | ¼ DC | 106–108 |
| 50 | 4" | 750 | 40 | ¼ DC | 108–110 |
| 50 | 2" | 750 | 40 | ¼ DC | 110–112 |
| 40 | 7" | 750 | 40 | ¼ DC | 106–108 |
| 40 | 4" | 750 | 40 | ¼ DC | 107–109 |
| 40 | 2" | 750 | 40 | ¼ DC | 108–110 |
| 40 | 7" | 750 | 32 | ¼ Spec.[2] | 102–104 |
| 40 | 4" | 750 | 32 | ¼ " | 103–105 |
| 40 | 2" | 750 | 32 | ¼ " | 104–107 |
| 50 | 7" | 750 | 32 | ¼ " | 104–106 |
| 50 | 4" | 750 | 32 | ¼ " | 106–108 |
| 50 | 2" | 750 | 32 | ¼ " | 108–110 |
| 60 | 7" | 750 | 32 | ¼ " | 105–107 |
| 60 | 4" | 750 | 32 | ¼ " | 105–109 |
| 60 | 2" | 750 | 32 | ¼ " | 109–111 |
| 80 | 7" | 750 | 32 | ¼ " | 105–107 |
| 80 | 4" | 750 | 32 | ¼ " | 107–109 |
| 80 | 2" | 750 | 32 | ¼ " | 111–113 |

[1] S. O. Standoff Distance From Torch Jets to Arc Area
[2] Composition According to U.S. Pat. application Ser. No. 848,817, filed Nov. 7, 1977.
Note:
Arcair Model K-5 hand torch
GR-1933 or Scott 452 Sound Level Meter with Microphone 20" away from the arc and perpendicular to the direction of travel From the foregoing table it is apparent that as the stick-out distance decreases, the noise level increases. It has also been observed that if the stick-out distance is maintained at 4" or greater, optimum noise reduction is achieved.

Lastly, U.S. Pat. No. 4,103,350, granted Aug. 1, 1978 discloses a method of surrounding a welder's ears, without touching them with a sound absorbing material to reduce the noise level striking the ear of the welder. Thus, in the conventional air-carbon arc process, it has been discovered that if the velocity of air at the arc area is maintained between 90 and 170 feet per second, special electrodes with noise suppressing additives are used, acoustical material is disposed around the ears of the operator, the stick-out distance of the electrode is kept at 4" or greater and the arc voltage is maintained at a maximum of 40 volts significant reduction in the operating noise level is achieved. Not all of the foregoing must be used in conjunction to achieve significant reduction in the noise level. However, it is possible by use of the velocity control, special electrodes and helmet to reduce the noise pressure on an operator's ear to a level below 95 dbA.

One observation that has been made is that while further reductions in the velocity of air may be made at velocities below 90 feet per second air striking the arc area may not produce a gouge that is comparable to a gouge produced by the conventional process.

Having thus disclosed our invention, what we desire to be secured by Letters Patent of the United States is set forth in the appended claims.

What is claimed is:

1. In a manually operated air-carbon arc cutting and gouging torch having a handle with a body having means to grip an elongated electrode leaving a portion of the electrode length exposed to project toward a workpiece so that an arc may be struck and maintained between the electrode tip and the workpiece, at least one air nozzle means on said body connected through a passage in the body to a source of high pressure air so that a stream of high pressure air can be directed along an aerial path along the exposed length of the electrode toward the electrode tip to blow metal from the arc as it is melted, and a spool valve including a generally frusto-conical portion adapted to engage a complimentary shaped valve seat in said passage and adapted to start and stop air flow through said nozzle; the improvement which comprises in combination:

a generally cylindrical bore through said frusto-conical portion of said spool valve adapted to be positioned to admit air to flow from said source to said nozzle without unseating said valve and means on said spool valve disposed generally parallel to the cylinder axis of said bore to indicate the position of said bore relative to said passage in said body whereby the operator can manually select to admit full air source pressure to said nozzle or limit air pressure across said nozzle to a maximum of sixty pounds per square inch regardless of said source pressure so that the operating noise level can be reduced at least 4 dbA.

2. A torch according to claim 1 wherein said means on said spool valve used to indicate the position of said bore includes means to rotate said valve to position said bore in said spool valve relative to said passage in said body.

* * * * *